United States Patent [19]
Garnett

[11] 3,787,132
[45] Jan. 22, 1974

[54] CLAMPING ARRANGEMENT
[75] Inventor: Charles Alexander Garnett, Worcester, England
[73] Assignee: Edward Williams Holdings Limited, Birmingham, England
[22] Filed: Apr. 6, 1971
[21] Appl. No.: 131,691

[30] Foreign Application Priority Data
Apr. 7, 1970 Great Britain.................. 16,395/70

[52] U.S. Cl............................. 403/290, 308/3 A
[51] Int. Cl........................................ F16b 12/20
[58] Field of Search.......... 287/20.3, 124, 20.92 T, 287/189.36 C; 308/3 A; 29/1.5

[56] References Cited
UNITED STATES PATENTS
744,559  11/1903  Kendrick .............................. 29/1.5
3,378,285  4/1968  Staley .............................. 287/52.05
2,735,519  2/1956  Frischmann.............. 287/20.92 T X
3,529,859  9/1970  Garczynski................. 287/189.36 C Primary Examiner—Andrew V. Kundrat
Attorney, Agent, or Firm—Holman & Stern

[57] ABSTRACT

An arrangement for securing an attachment to a body has a split dovetail extending from the attachment and slidable in a dovetailed recess in the body. One portion of the split dovetail is flexed by a wedge arrangement to provide a clamping action. The other portion of the dovetail is not deflected by wedging action and thereby provides a relatively fixed locating face.

10 Claims, 3 Drawing Figures

CLAMPING ARRANGEMENT

This invention relates to a locating and clamping arrangement for an attachment to a body and has as an object to provide such an arrangement in a convenient form.

According to the invention a locating and clamping arrangement for an attachment to a body, whereby a pair of mating faces on the attachment and body respectively may be urged into engagement, comprises a dovetail extending from one of the said faces, the dovetail being formed as a sliding fit in the recess, a slot extending the length of the dovetail and dividing the dovetail into two portions, a pair of wedge members engaging parts of the slot and means for moving the wedge members relative to each other, to urge the dovetail portions apart and into clamping engagement with the recess, the said mating faces thereby being drawn into close engagement.

Figure 1:
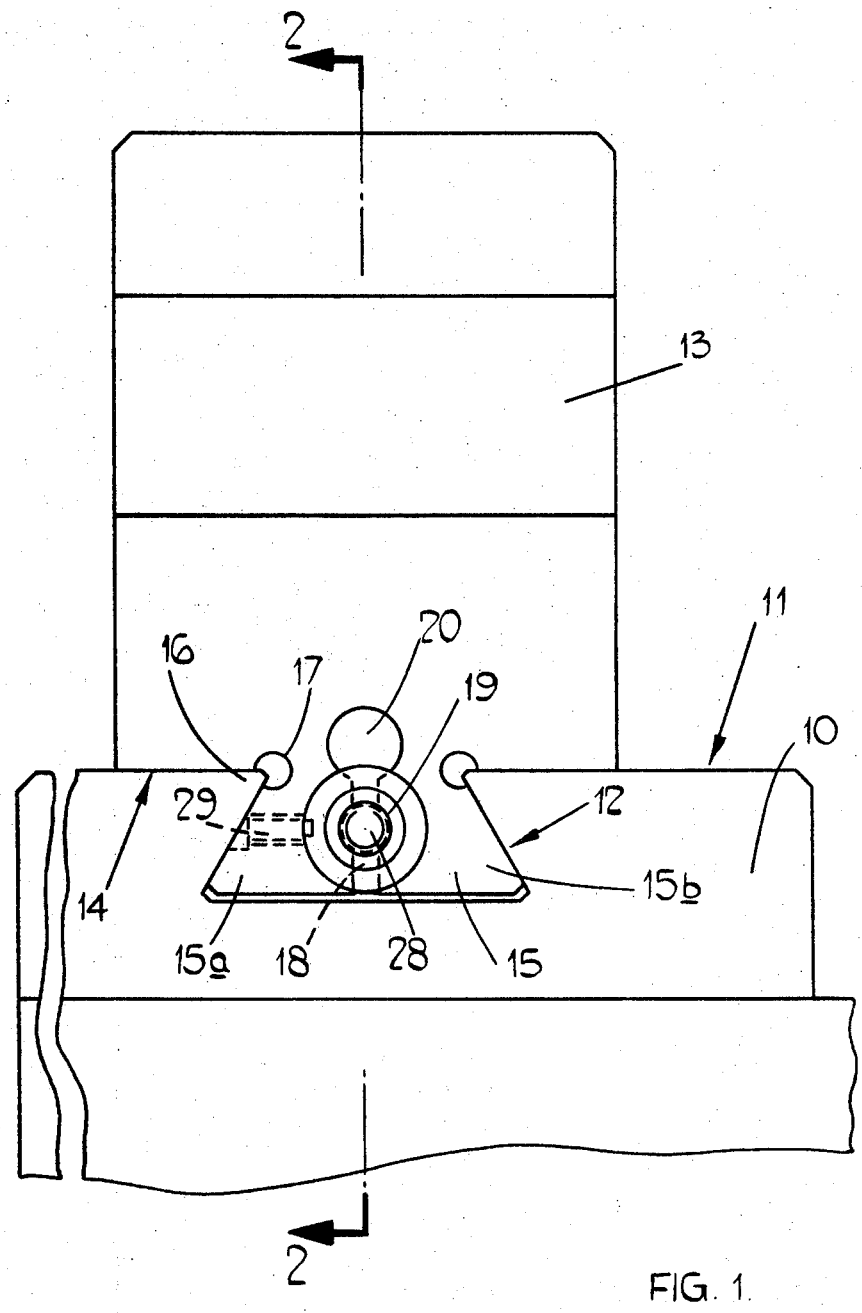
Figure 2:
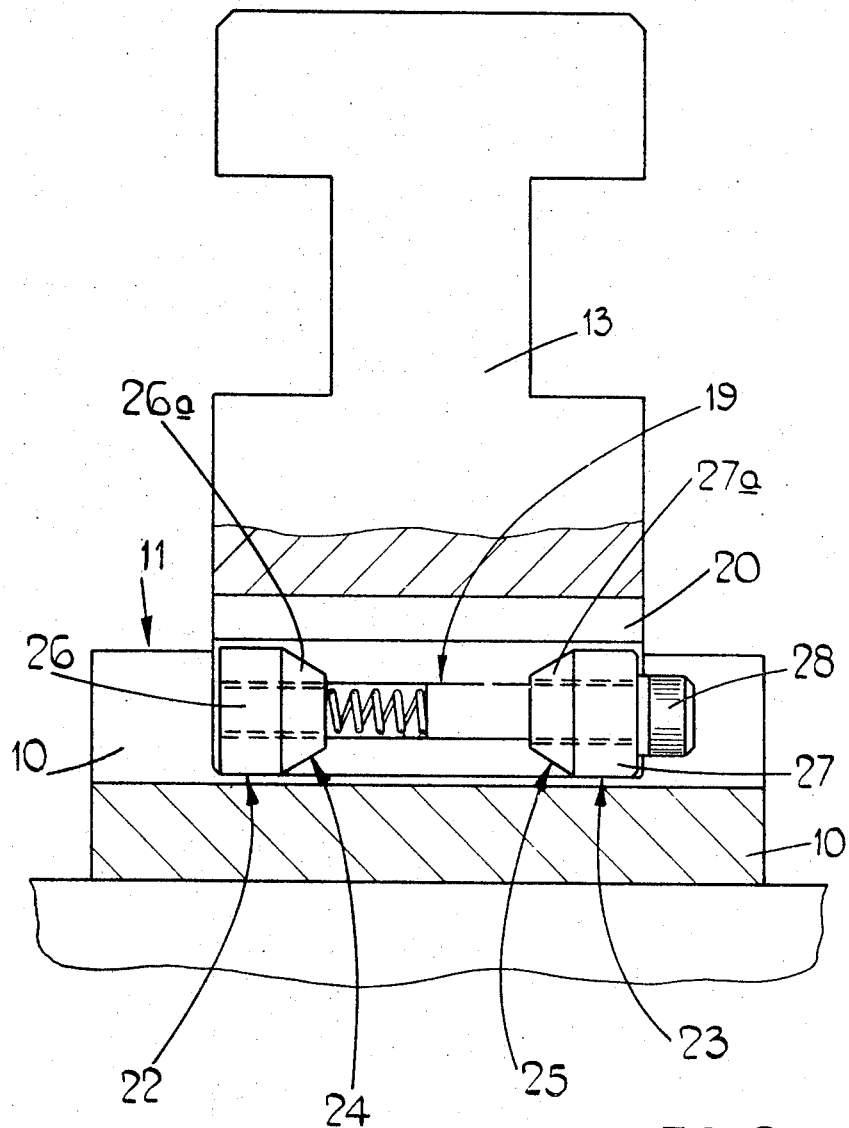
Figure 3:
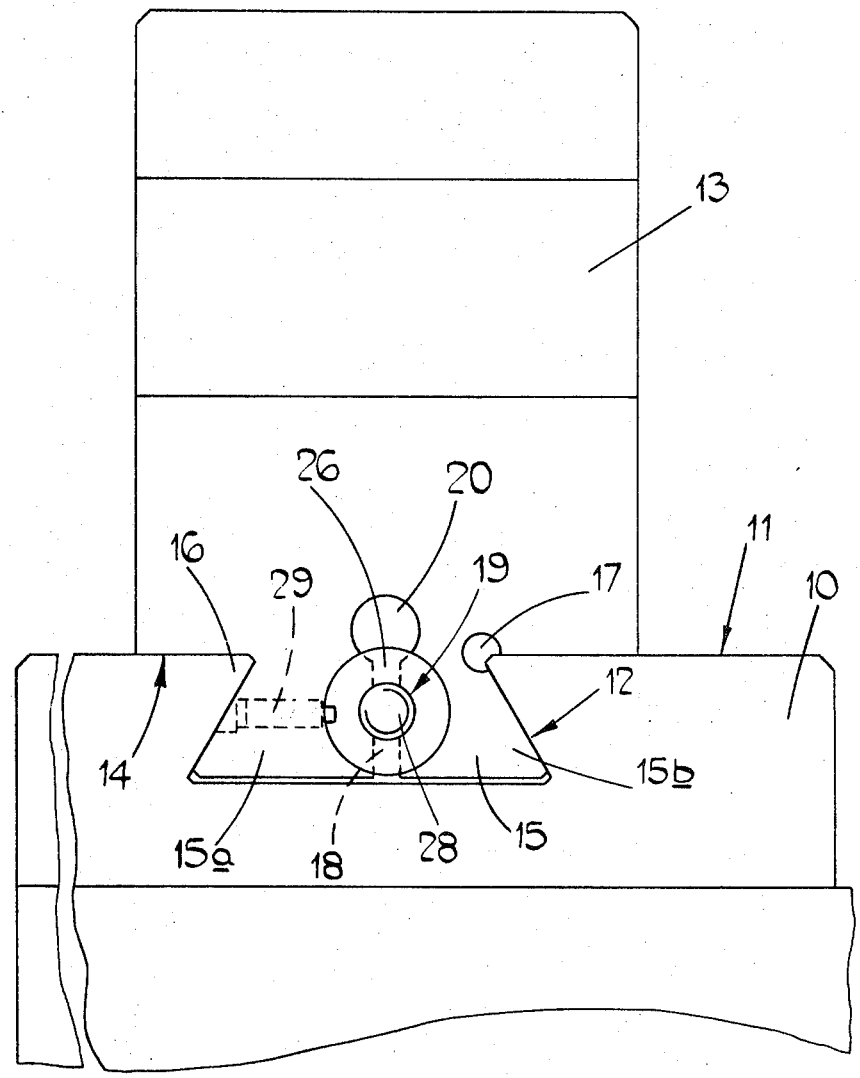

A locating and clamping arrangement according to the invention will now be described by way of example and with reference to the accompanying drawings in which:

FIG. 1 is an elevation of the arrangement;
FIG. 2 is a section on line 2—2 in FIG. 1,
FIG. 3 is an elevation like FIG. 1 showing an alternative embodiment of the invention.

A part 10, which in the example is the cross-slide of a lathe, has a face 11 in which is formed a dovetailed recess 12. An attachment 13 is adapted to support a lathe tool and has a face 14. Projecting from the face 14 is a dovetail extension 15 which is formed as a sliding fit in the recess 12. The projecting and re-entrant corners 16, 17 of the part 10 and attachment 13 respectively are relieved to provide mutual clearance.

The dovetail extension 15 has a slot 18 extending therethrough and dividing the extension 15 into a pair of identical portions 15a, 15b. Included in the slot 18 is a through bore 19, whose function will later be explained, and a through bore 20 whose purpose is to reduce the sections of the portions 15a, 15b where they join the remainder of the attachment 13. The relieving of corners 17 also reduces the sections of portions 15a, 15b. The through bore 19 is formed at its ends with substantially identical counter-bored portions 22, 23 and countersunk portions 24, 25. A pair of bushes 26, 27 having respective tapered portions 26a, 27a lie within the bore 19 to engage the countersunk portions 24, 25 respectively. A bolt 28 passes through a clearance hole in bush 27 and threadedly engages bush 26. Collar 26 is prevented from rotating by a set-screw 29 lying wholly within the portion 15a.

In use, the extension 15 is slidably engaged with the recess 12. The bolt 28 is rotated to urge the bushes 26, 27 towards one another, providing a wedge action against the associated countersunk portions 24, 25 of the slot 18 and urging the portions 15a, 15b apart. The dovetail extension 15 is thus urged into clamping engagement with the recess 12, and thereby draws the attachment 13 towards the part 10 so that the faces 11, 14 are in close engagement.

When the bolt 28 is unscrewed the elasticity of the portions 15a, 15b is sufficient to urge the bushes 26, 27 apart, releasing the clamping action.

The alternative arrangement shown in FIG. 3 is generally similar to that previously shown and described, but differs in that the slot 18 divides the extension 15 into a pair of unequal portions 15a, 15b. The re-entrant corner 17 of the portion 15b only is relieved.

In use, therefore, the portion 15a is not deflected by the wedge action described, and thereby provides a relatively fixed locating face engageable with the mating face of the recess 12.

I claim:

1. A locating and clamping arrangement for an attachment to a body, whereby a pair of mating faces on the attachment and body respectively may be urged into engagement, comprising a dovetail extending from one of said faces, a dovetail recess extending across the other of said faces, the dovetail being formed as a sliding fit in the recess, a slot extending the length of the dovetail and dividing the dovetail into two portions, a pair of wedge members engaging parts of the slot and means for moveing the wedge members relative to each other, to urge the dovetail portions apart and into clamping engagement with the recess, said mating faces thereby being drawn into close engagement, a re-entrant corner between one of said dovetail portions and said one face being relieved so as to reduce the cross section of said one portion in the plane of said one face.

2. An arrangement as claimed in claim 1 in which said slot divides the dovetail into two substantially equal portions.

3. An arrangement as claimed in claim 1 in which the re-entrant corner between the other of said dovetail portions and said one face is relived so as to reduce the cross section of said other portion in the plane of said one face.

4. An arrangement as claimed in claim 1 in which said slot divides the dovetail into two unequal portions.

5. An arrangement as claimed in claim 4 in which said re-entrant corner is that between the smaller of said portions and said one face.

6. An arrangement as claimed in claim 1 in which the slot includes a first through bore positioned so as to reduce the cross sections of said portions adjacent the plane of said one face.

7. An arrangement as claimed in claim 1 in which said slot includes a through bore having a pair of countersunk portions which form said parts of the slot engaged by said wedge members.

8. An arrangement as claimed in claim 7 which said wedge members comprise a pair of tapered bushes.

9. An arrangement as claimed in claim 8 in which said means for moving the wedge members comprises a bolt abutting one of the bushes and threadedly engaging the other of the bushes.

10. An arrangement as claimed in claim 9 which includes means for preventing rotation of said other bush.

* * * * *